United States Patent Office 3,467,660
Patented Sept. 16, 1969

3,467,660
5,9-DIMETHYL-AZABICYCLO [3-3-1] NONANE AND PROCESS FOR MAKING SAME
Burton D. Beitchman, Springfield, Pa., assignor to Air Products and Chemicals, Inc., Philadelphia, Pa., a corporation of Delaware
No Drawing. Filed June 13, 1966, Ser. No. 556,867
Int. Cl. C07d *31/02, 31/20*
U.S. Cl. 260—293          4 Claims

ABSTRACT OF THE DISCLOSURE

Vapors of 3-(gamma aminopropyl)-2,3 dimethyl piperidine are converted to ammonia and a mixture of 5,9 dimethyl-1-azabicyclo-(3.3.1) nonane and 5,9 dimethyl-1-azabicyclo-(3.3.1) nonene at about 675–715° F. over a cracking catalyst derived from kaolin. The tertiary amines are active catalysts for reactions of organic isocyanates.

---

The present invention relates to certain novel azabicyclo compounds. More particularly, the present invention relates to the compounds 5,9-dimethyl-1-azabicyclo (3.3.1) nonane and 5,9-dimethyl-1-azabicyclo (3.3.1) nonene and to methods for the preparation of these compounds.

1-azabicyclo (3.3.1) nonane has been a subject for investigation since at least 1923 because of a structural similarity to quinuclidine, homococaine and other compounds having physiological activity.

It has now been discovered that the synthesis of 5,9-dimethyl-1-azabicyclo (3.3.1) nonane and 5,9-dimethyl-1-azabicyclo (3.3.1) nonene can be effected by cyclization of 3-(gamma-amino-propyl)-2,3-dimethyl piperidine over a solid acidic catalyst at temperatures in the range of 550–750° F. and preferably over kaolin at temperatures of about 620 to about 730° F. and at a space rate of 0.5–1.0 liquid hourly space velocity. The aforementioned azabicyclo compounds have activity as urethane catalysts. Additionally, these newly synthesized azabicyclo compounds have indicated activity as anesthetics, analgesics, antispasmodics and as intermediates for pharmaceuticals and anthelmintics.

The starting material, 3-(gamma-aminopropyl)-2,3-dimethyl piperidine, for preparation of 5,9-dimethyl-1-azabicyclo (3.3.1) nonane and 5,9-dimethyl-1-azabicyclo (3.3.1) nonene of the present invention, has been reported to have been prepared in 77% yield in an article by N. F. Albertson, J. Am. Chem. Soc., 72, 2594 (1950). The procedure employed by Albertson is believed to have involved the hydrogenation of a cyanoethylation product of methylethylketone

[CH₃—CO—(CH₂CH₂CN)₂—CH₃]

with a Raney nickel catalyst in ethanol.

It has been found that 3-(gamma-aminopropyl)-2,3-dimethyl piperidine may also be synthesized in excellent yields (81.3%) by the reduction of

CH₃—CO—(CH₂CH₂CN)₂—CH₃ employing Raney cobalt in ammoniacal ethanol at 1700–2300 p.s.i.g. at a temperature of about 125° C.

EXAMPLE I 4.6 grams of 3 - (gamma-aminopropyl)-2,3-dimethyl piperidine at about 0.4 cc./min. were passed through a Vycor reactor containing 10 ml. of fine quartz as a preheater and contacted with 50 ml. of kaolin catalyst at a temperature within the range of 675–715° F. Nitrogen was passed through the reactor during the addition of charge material at a rate of 250 cc./hr. Approximately 1.5 grams of material were collected which on analysis gave the following results:

| Compound | Mass Spectroscopy, percent | Vapor Fractometry, percent |
|---|---|---|
| 5,9-dimethyl-1-azabicyclo(3.3.1)nonane | 37.1 | 33.7 |
| 5,9-dimethyl-1-azabicyclo(3.3.1)nonene | 4.3 | |
| Balance | 58.6 | 66.3 |

Using gas chromatography, 5,9-dimethyl-1-azabicyclo-(3.3.1)nonane was readily separated and recovered in 98+% purity. The structure of the compound was verified by NMR spectral analysis.

The catalyst used in the above run consisted of commercially available kaolin catalyst marketed generally for petroleum cracking. Such catalyst was prepared in accordance with the methods of U.S. Letters Patent 2,904,520, and marketed in the form of cylinders approximately 4 mm. in length and diameter. The catalyst used above had a surface area of about 87 m.²/g. and a 31 Activity Index (CAT–A method; Alexander et al., p. R–537, National Petroleum News, Aug. 2, 1944).

EXAMPLE II

Approximately 37.5 grams of 3-(gamma-aminopropyl)-2,3-dimethyl piperidine were passed through a reactor over the same catalyst as in Example I at a temperature within the range of 630–705° F. over a 101 minute period of time. As in Example I, nitrogen was passed through the reactor with the charge and employed to flush out the product.

22.6 grams of product were obtained which on analysis gave the following results:

| Compound | Mass Spectroscopy, percent | Vapor Fractometry, percent |
|---|---|---|
| 5,9-dimethyl-1-azabicyclo(3.3.1)nonene | 36.9 | 41.6 |
| 5,9-dimethyl-1-azabicyclo(3.3.1)nonane | 14.4 | 17.4 |
| Balance | 48.7 | 32.9 |

Samples of 5,9 - dimethyl-1-azabicyclo(3.3.1)nonene were readily separated for recovery by gas chromatography to obtain a 99+% pure material. The structure of this material was verified by NMR spectral analysis.

By suitable selection of the reaction conditions, the relative proportions of 5,9-dimethyl - 1 - azabicyclo(3.3.1) nonane and 5,9-dimethyl-1-azabicyclo(3.3.1)nonene in the product can be varied. For example, by subjecting the reaction product to hydrogenation the yield of 5,9-dimethyl-1-azabicyclo(3.3.1)nonane may be increased to the point of eliminating 5,9-dimethyl-1-azabicyclo(3.3.1)nonene.

The preferred catalyst is silica-alumina, particularly the kaolin-type described above familiarly used in cracking hydrocarbons, in the form of granules, molded pellets, beads, powder or other acceptable physical form. Other suitable catalysts although possibly differing in degree of effectiveness include the synthetic dried gel type catalyst formed by suitable impregnation of silica gel, or by co-precipitation of alkali metal silicate with an aluminum compound, to provide a gel comprising 60–90% by weight SiO₂ to 40–10% by weight Al₂O₃ and which may include therein other refractory metal oxides such as zirconia or magnesia. Other known silica-alumina catalysts may be employed, including various active or activated acidic-form clays of the montmorillonite, kaolin or halloysite types. The catalysts may contain a minor amount of a dehydrogenating metal component, such as 0.5 to 3% nickel, supported on the silica-aluminum carrier. Other acidic solid catalysts may be employed, such as an active form of alumina associated with fluoride or phosphate ion. It is to be understood that the term "solid"

in connection with the catalyst does not preclude the porosity associated with effective catalysts.

The compounds 5,9 - dimethyl - 1 - azabicyclo(3.3.1) nonane and 5,9-dimethyl-1-azabicyclo(3.3.1)nonene were tested for their activity in catalyzing the NCO-water reaction by the Wolfe procedure (H. H. Wolfe, Du Pont Foam Bulletin, Mar. 16, 1960). On an equal weight basis 5,9-dimethyl-1-azabicyclo(3.3.1)nonane was 68% as effective as triethylenediamine; on an equal molar basis it was 89% as effective. 5,9-dimethyl-1-azabicyclo(3.3.1) nonene on an equal weight bsais was 30% as effective as triethylene diamine and on an equal molar basis was 39% as effective. Triethylene diamine, by the Wolfe procedure, is one of the most active catalysts for the NCO-water reaction and is a commercially acceptable polyurethane catalyst.

Obviously, many modifications and variations of the invention as hereinbefore set forth, may be made without departing from the spirit and scope thereof, and therefore only such limitations may be imposed as are indicated in the appended claims.

What is claimed is:

1. The compound 5,9-dimethyl-1-azabicyclo (3.3.1) nonane.

2. The method of preparing 5,9-dimethyl-1-azabicyclo (3.3.1)nonane which comprises passing 3-(gamma-aminopropyl)-2,3-dimethyl piperidine over solid acidic catalysts at a temperature in the range of 550–750° F.

3. The method of claim 2 wherein the temperature is within the range of about 620 to about 730° F. and wherein the 3-(gamma-aminopropyl)-2,3-dimethyl piperidine is passed over the catalyst at a space rate of 0.5–1.0 liquid hourly space velocity.

4. The method of claim 2 wherein the solid acidic catalyst is a cracking catalyst derived from kaolin.

References Cited

Mosby: The Chemistry of Heterocyclic Compounds, Heterocyclic Systems With Bridgehead Nitrogen Atoms, part II, Interscience (1961), pp. 1324–29.

HENRY R. JILES, Primary Examiner

G. THOMAS TODD, Assistant Examiner

U.S. Cl. X.R.

260—2.5, 77.5, 290, 999